United States Patent [19]

Lawwill

[11] Patent Number: 5,121,937
[45] Date of Patent: Jun. 16, 1992

[54] SUSPENSION BICYCLE

[76] Inventor: Mert Lawwill, 148 Rockhill Dr., Tiburon, Calif. 94920

[21] Appl. No.: 626,998
[22] Filed: Dec. 13, 1990
[51] Int. Cl.⁵ .................... B62K 25/04; B60G 15/00
[52] U.S. Cl. .................................. 280/284; 180/227
[58] Field of Search ............... 280/284, 283, 285, 288; 180/227

[56] References Cited

U.S. PATENT DOCUMENTS

| | | | |
|---|---|---|---|
| 4,058,181 | 11/1977 | Buell | 280/284 X |
| 4,114,918 | 9/1978 | Lutz | 280/284 |
| 4,463,824 | 8/1984 | Boyesen | 280/284 X |
| 4,596,302 | 6/1986 | Suzuki et al. | 280/284 X |
| 4,789,174 | 12/1988 | Lawwill | 280/284 |
| 4,951,791 | 8/1990 | Belil Creixell | 280/284 X |
| 5,000,470 | 3/1991 | Kamler et al. | 280/284 X |

FOREIGN PATENT DOCUMENTS 841661  8/1938  France .................. 280/284

Primary Examiner—Charles A. Marmor
Assistant Examiner—Kevin Hurley
Attorney, Agent, or Firm—James E. Eakin

[57] ABSTRACT

A suspension bicycle includes swing arms, control arms and hub plates connected to the seat riser tube of the frame in a trapezoidal arrangement balanced to offset forces applied to the rear wheel by the chain to prevent absorption of pedaling energy by the suspension system while still permitting the suspension system to be responsive to changes in road conditions.

4 Claims, 3 Drawing Sheets 5,121,937

SUSPENSION BICYCLE

FIELD OF THE INVENTION

This present invention relates to bicycles, and more particularly relates to bicycles employing suspension means for at least the rear wheel.

BACKGROUND OF THE INVENTION

Bicycles have long been used as a means of transportation and recreation. However, virtually all bicycles known in the prior art have involved a relatively rigid frame, which transmits directly to the rider shocks resulting from potholes, rocks or other unevenness in the riding surface. This has resulted in discomfort to the rider which is at the least undesirable, if not unacceptable.

The typical solution to this problem found in the prior art has been to include a shock absorbing suspension on the bicycle similar to those found in motorcycles or on cars. The difficulty with nearly all prior art designs is that each of them absorbs a significant amount of force which would otherwise provide forward movement. While this loss is not significant for a motorcycles or a car, it is unacceptable where the only available motive force is the pedaling of a human being.

The energy loss in cycles typically found in the prior art results from the fact that when the rear sprocket on the cycle turns, the rotational force on the rear wheel causes the rear wheel to rise upward against the suspension. This will typically be perceived as the cycle settling slightly.

There has therefore been a need for a suspension bicycle which transforms substantially all of the pedaling force into forward motive force without substantial loss to the suspension.

SUMMARY OF THE INVENTION

The present invention provides a bicycle suspension which transforms substantially all of the pedaling force into forward motive force by providing a novel and unobvious linkage arrangement which neutralizes the tendency of the suspension to absorb the pedal force.

More specifically, the present invention provides a linkage which creates a vectored force substantially equal to and opposite from the pedaling force which would normally be absorbed by the suspension of the bicycle. As a result of this cancellation of forces, nearly all of the pedaling force is converted to forward motion. While the advantages provided by the present invention are particularly applicable to bicycles, the energy saving features of the present invention may be implemented in motorcycles or other motor driven vehicles.

In a presently preferred embodiment of the present invention, the desired balance is substantially achieved by providing a pair of swing arms pivotally mounted about the bottom bracket of the bicycle and extending toward the hub of the rear wheel. A pair of control arms affixed to the rear of the seat riser tube also extend toward the hub of the rear wheel. A hub plate, on which the rear wheel is mounted, connects at its top to the rear end of the control arms, while the hub plate connects at its bottom to the swing arms. Because of the geometry of the connecting holes in the hub plate, the rear end of the swing arms is maintained slightly closer to the seat riser tube than the rear of the control arms. This careful maintenance of position maintains the suspension in careful balance during pedaling, while at the same time permitting absorption of shocks and unevenness in the riding surface.

It is therefore one object of the present invention to provide a suspension bicycle in which substantially all of the pedaling forces are available for forward movement rather than lost to the suspension.

It is another object of the present invention to provide a simple but efficient suspension bicycle which is extremely durable.

These and other objects of the invention will be better understood from the following Detailed Description of the Invention, taken together with the attached Figures.

THE FIGURES

DETAILED DESCRIPTION OF THE INVENTION

Figure 1:
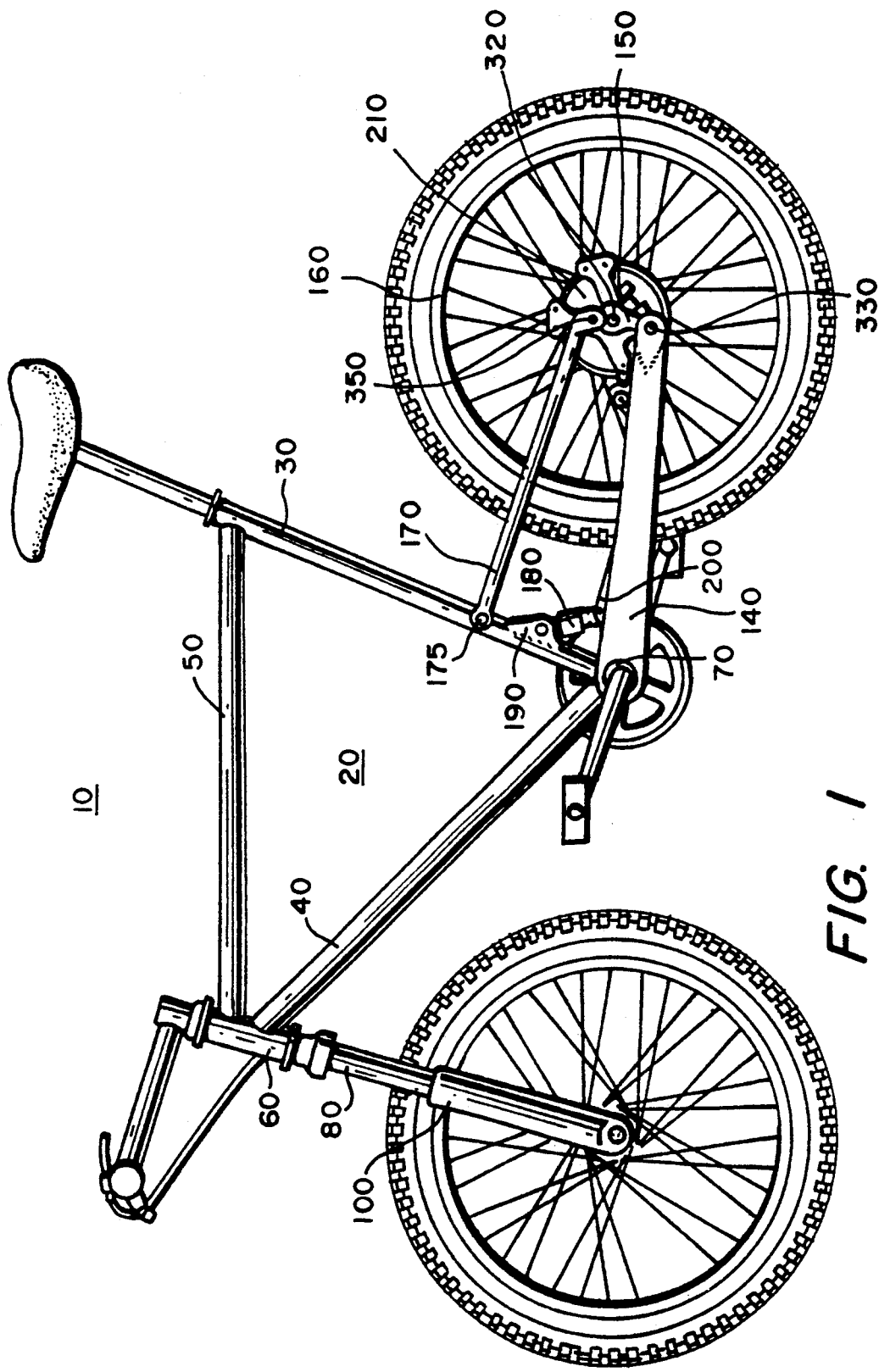
FIG. 1 is a side elevational view of a suspension bicycle according to the present invention.

Referring first to FIG. 1, the presently preferred embodiment of the invention may be seen. The bicycle 10 includes a frame 20 which includes a seat riser tube 30, a down tube 40, a brace tube 50, and a front fork tube 60.

The seat riser tube 30 is rigidly affixed at its top to the brace 50, and is rigidly connected at its bottom end to the bottom bracket housing 70. The bottom end of the down tube is likewise rigidly affixed to the bottom bracket housing 70, while the top end of the down tube 40 is rigidly attached to the front fork tube 60. The brace tube 50 extends between substantially the top of the seat riser tube 30 and the front fork tube 60. Conventional front forks 80 are maintained within the front fork tube 60 in a conventional manner. The front forks 80 may include a shock absorber 100 of a conventional nature, such as ROCK SHOX TM.

The rear suspension of the bicycle 10 comprises a pair of swing arms 140 (only one of which can be seen in FIG. 1) which are pivotably mounted about the bottom bracket housing 70. The rear end of the swing arms 140 are pivotably attached to their respective rear hub plates 150. The hub plates support the rear wheel 160, and at their upper end pivotably attach to a pair of control arms 170 (only one shown in FIG. 1). The front ends of the control arms 170 pivotably connect to the seat riser tube 30 at a pivot point 175. For convenience of description, the pair of swing arms may occasionally be referred to as a single swing arm herein; likewise, the pair of control arms may occasionally be referred to as a single control arm.

A shock absorber 180 is connected between a first bracket 190 integrated into the seat riser tube 30 and a second bracket 200 integrated into the swing arms 140. The shock absorber travel is intended to provide substantially a 3:1 relationship between the travel of the rear wheel and the compression travel of the shock absorber, although other ratios are also acceptable depending on the particular application. The shock absorber 180 absorbs shocks during normal operation of the rear suspension comprised of the seat riser tube 30, the swing arms 140, hub plate 150, and control arms 170. Importantly, the rear suspension continues to provide the ability to absorb shocks even during pedaling.

Figure 2:
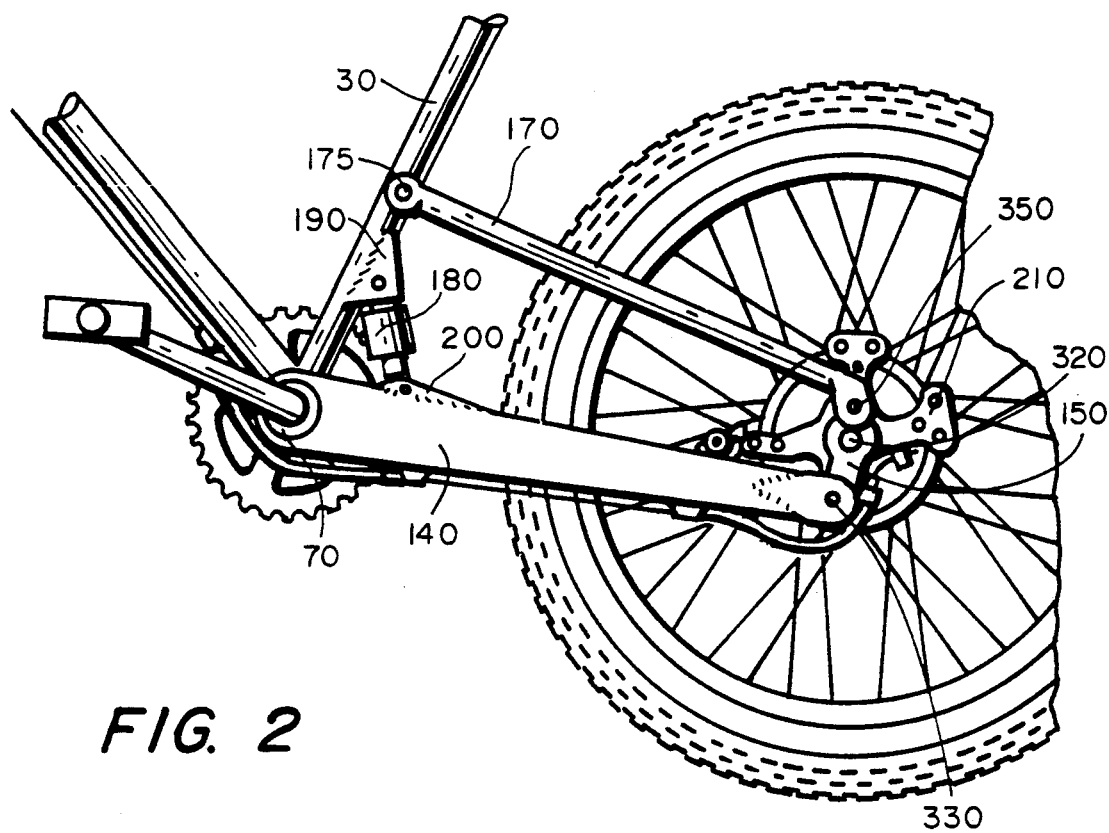
FIG. 2 is a side elevational view of the left side of the bicycle from the chain wheels to the rear wheel.
Figure 3:
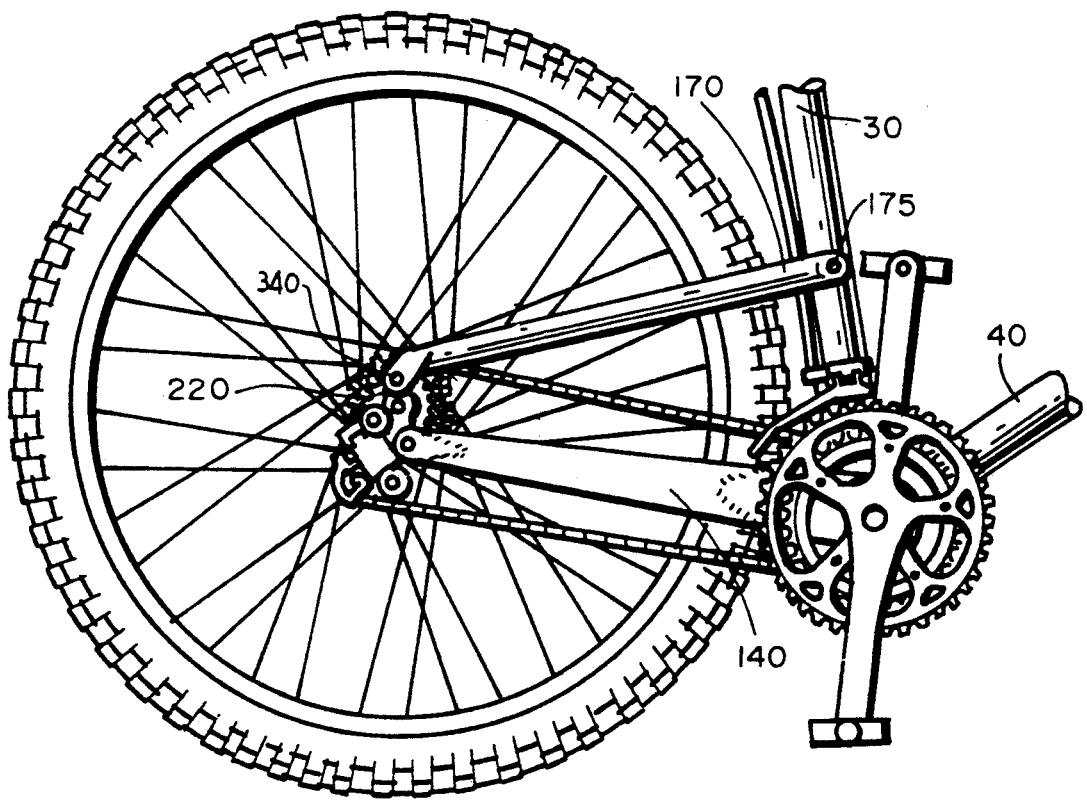
FIG. 3 is a side elevational view of the right side of the bicycle from the chain wheels to the rear wheel.
Figure 4:
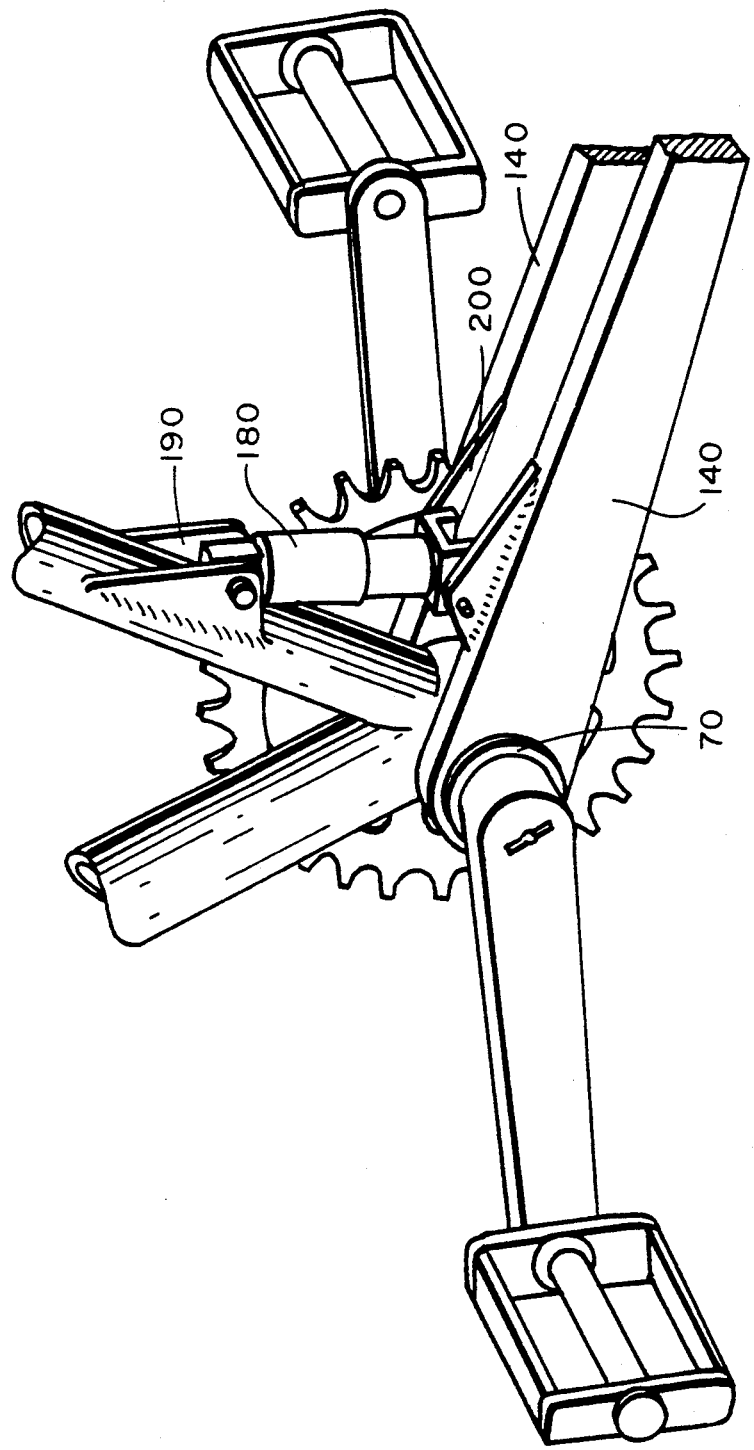
FIG. 4 is a detailed left side perspective view of the bottom bracket and control arms according to the present invention.

Referring next to FIGS. 2 and 3, the rear suspension may be better appreciated. For clarity the chain is not shown in FIG. 2, while a conventional chain and derailleur arrangement is shown in FIG. 3. It will be appreciated that the bicycle shown in the figures is a mountain bike, although the present invention could readily be applied to other types of bicycles or vehicles. A disk brake 210 for the rear wheel is attached to the hub 220 of the rear wheel 160 in a conventional manner at attachment point 320. Outboard of the disk brake is attached the hub plate 150, to which the swing arms 140 and control arms 170 are attached. The swing arms 140 attach to the hub plate 150 at a pivot point 330, while the control arms 170 attach to the hub plate at a pivot point 350.

Upon application of a downward force, the swing arms 140 will move upward by pivoting about the bottom bracket housing 70. The upward force will directly compress the shock absorber 180. As the swing arms 140 move upward, their connection to the hub plate 150 forces the plate 150 to pivot in a clockwise direction (FIG. 2) about the pivot point 330. The corresponding clockwise rotation of the pivot point 350 causes the control arms 170 to move slightly downward relative to the hub attachment point 320. Because the attachment point 320 is offset toward the pivot point 350 and away from the pivot point 330, and also because of the location of the pivot points 70 and 175, the control arms 170, the swing arms 140 and the rear hub plate 150 impose a physical limit on the travel through which the rear wheel 160 can move due to pedaling forces.

A key feature of the present invention is that the suspension includes features which balance the tendency of a suspension to absorb pedaling energy, or other motive energy. At the same time, the present invention is simple and durable.

The energy absorbing tendencies are neutralized by virtue of the trapezoid formed by the location of the pivot points 70 (the bottom bracket housing), 175, 330 and 350, together with the point 320 at which the rear wheel is affixed. It will be appreciated from FIGS. 2 and 3 that the pivot point 175 is located substantially above the attachment point 320, whereas the pivot point 70 is located only slightly below.

When a rotational force is applied to the wheel 160, as during pedaling, the point 340 attempts to rise. Because of the control arm 170, the point 340 may only move in an arc about pivot point 175. However, the amount of movement is limited by the length of the swing arms 140, which can only pivot about the point 70. As a result, the swing arms 140, control arms 170 and pivot plate 150 provide a force having a downward component. This downward force vector is applied quickly so that the rotational force applied to the rear wheel is translated efficiently into forward movement. It can therefore be appreciated that the control arms 170, hub plates 150, and swing arms 140 are configured to balance the forces applied to the rear wheel by the chain during pedaling so as to prevent energy absorbing movement of the rear suspension as the result of such pedaling.

It can further be appreciated that the balancing of forces between the control arms and the swing arms does not impose a mechanical limit on the travel of the rear wheel in response to shocks, but rather provides a locking out, or leverage limit, of movement in response to a chain force. This balancing of forces therefore permits substantially all of the rider's pedaling energy to be translated into forward movement, rather than being absorbed by the suspension system as occurs in the typical prior art.

An additional and unexpected feature of the present invention is that the bicycle of the present invention provides increased traction during operation, and particularly while climbing hills. The increased traction results because rotation of the control arms 170 appears to cause a transfer of weight to the swing arms 140. This, in turn, transfers the weight to a point higher over the axle center, resulting in increased traction.

In an exemplary arrangement, the approximate dimensions of the suspension trapezoid (measured from the centers of the respective pivot points) can be as follows: swing arms—16.4 inches; control arms—15.850 inches; distance between bottom bracket housing 70 and pivot point 175—eight inches; distance between the hub attachment point 320 and the swing arm pivot point 330—1.585 inches; distance between the attachment point 320 and the control arm pivot point 350, 0.8 inches; angle of seat riser tube down from vertical, 17°. The pivot points 320, 330 and 350 are substantially within a straight line, but could be varied somewhat without serious adverse consequences. Other geometries also work, and can be determined from the ratios of the dimensions provided above. Similarly, specific dimensions may be varied to adjust specific characteristics for the particular rider, so long as the foregoing basic teaching of balancing the forces is maintained.

Having fully described one embodiment of the present invention, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. A suspension bicycle having
   a rear wheel with a hub,
   a frame including a seat riser tube and a bottom bracket housing having left and right sides,
   a pair of hub plates, one for either side of the rear wheel, each having an attachment point for attaching to the hub of the rear wheel, a first pivot point located above the attachment point and a second pivot point located below the attachement point,
   a swing arm assembly having a pair of forward pivot points and a pair of rear pivot points, the pair of forward pivot points being formed as a loop and adapted to pivotably connect around the left and right sides of the bottom bracket housing, the pair of rear pivot points each pivotably connected to the second pivot point of the respective one of the pair of hub plates,
   a control arm assembly having at least one front pivot point and a pair of back pivot points, the at least one front pivot point pivotably connected to an upper pivot point on the seat riser tube and the pair of back pivot points each pivotably connected to the first pivot point of the respective one of the pair of hub plates, and
   a shock absorber connected directly between the swing arm assembly and the frame which compresses and extends in accordance with the smoothness of the riding surface to absorb shocks.

2. The suspension bicycle of claim 1 wherein the control arm assembly has two front pivot points.

3. The suspension bicycle of claim 1 wherein the swing arm assembly, control arm assembly, hub plates and the portion of the seat riser tube between the bottom bracket housing and the upper pivot point define a suspension trapezoid, and the geometry of the suspension trapezoid is substantially in direct proportion to the following distances: distance between forward pivot points and rear pivot point of swing arm assembly, 16.4 inches; distance between the at least one front pivot point and the back pivot points of the control arm assembly, 15.850 inches; distance between bottom bracket housing and the upper pivot point, 8 inches; distance between the hub attachment point and the first pivot point, 0.8 inches; distance between the hub attachment point and the second pivot point, 1.585 inches; angle of seat tube with respect to vertical, 17°.

4. The bicycle of claim 3 wherein the hub attachment point, the first pivot point and the second pivot point are substantially collinear.

* * * * *